US011248461B2

(12) United States Patent
Vehra et al.

(10) Patent No.: US 11,248,461 B2
(45) Date of Patent: Feb. 15, 2022

(54) MULTIPLE DOWNHOLE SYSTEMS USING MULTIFREQUENCY

(71) Applicant: Halliburton Energy Services, Inc., Houston, TX (US)

(72) Inventors: Imran Sharif Vehra, Kingwood, TX (US); Zinovy B. Krugliak, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 49 days.

(21) Appl. No.: 16/637,678

(22) PCT Filed: Feb. 19, 2019

(86) PCT No.: PCT/US2019/018632
§ 371 (c)(1),
(2) Date: Feb. 7, 2020

(87) PCT Pub. No.: WO2020/171801
PCT Pub. Date: Aug. 27, 2020

(65) Prior Publication Data
US 2021/0231005 A1      Jul. 29, 2021

(51) Int. Cl.
*E21B 47/12* (2012.01)
*H04L 12/40* (2006.01)
*H04L 29/08* (2006.01)

(52) U.S. Cl.
CPC .............. *E21B 47/12* (2013.01); *H04L 12/40* (2013.01); *H04L 67/12* (2013.01)

(58) Field of Classification Search
CPC .......... E21B 47/12; H04L 12/40; H04L 67/12
See application file for complete search history.

(56) References Cited

U.S. PATENT DOCUMENTS

| 10,539,013 B2* | 1/2020 | Vehra ............... H04L 5/0003 |
| 2005/0104743 A1* | 5/2005 | Ripolone ............ G01V 11/002 |
|  |  | 340/855.1 |
| 2018/0087374 A1 | 3/2018 | Robson et al. |
| 2018/0216457 A1 | 8/2018 | Derkacz et al. |

FOREIGN PATENT DOCUMENTS

| JP | 2009503308 A | 1/2009 |
| WO | 2919004999 A1 | 1/2019 |

OTHER PUBLICATIONS

International Search Report & Written Opinion in International Application No. PCT/US2019/018632, dated Nov. 18, 2019.

\* cited by examiner

*Primary Examiner* — Franklin D Balseca
(74) *Attorney, Agent, or Firm* — McGuireWoods LLP

(57) ABSTRACT

A method for downhole communication between multiple sets of sensors along a single wire bus includes communicating between a first set of sensors through the single wire bus. The first set of sensors include legacy sensors communicating at a legacy communication frequency. The method also includes communicating between a second set of sensors through the single wire bus. The second set of sensors communicates at a second communication frequency an order of magnitude greater than the legacy communication frequency. Further, the method includes communicating between a third set of sensors through the single wire bus. The third set of sensors communicates at a third communication frequency an order of magnitude greater than the legacy communication frequency.

20 Claims, 6 Drawing Sheets

MULTIPLE DOWNHOLE SYSTEMS USING MULTIFREQUENCY

BACKGROUND

The present disclosure relates generally to sensor communication during wellbore measurements, and more specifically to providing sensor communication at new frequencies along a single wire bus within a bottom hole assembly that does not interfere with operation of legacy sensors positioned along the bus or sensors communicating at other frequencies, among other features.

During drilling and survey operations within a well, the single wire bus is used for communication between tools positioned along the single wire bus and for sharing power between the tools positioned along the single wire bus. Legacy sensors, which are tools currently positioned along the single wire bus, generally communicate using a legacy single wire protocol based on MIL-STD-1553 standard for electrical characteristics of a data bus. Communications between several of the legacy sensors along the single wire bus using the legacy single wire protocol may result in congested transmissions along the single wire bus and a loss of communication precision. Additionally, communication using the legacy single wire protocol may not be compatible with other sensors that rely on different standards for data transmission across the single wire bus.

BRIEF DESCRIPTION OF THE DRAWINGS

Illustrative embodiments of the present disclosure are described in detail below with reference to the attached drawing figures, which are incorporated by reference herein, and wherein.

Figure 1:
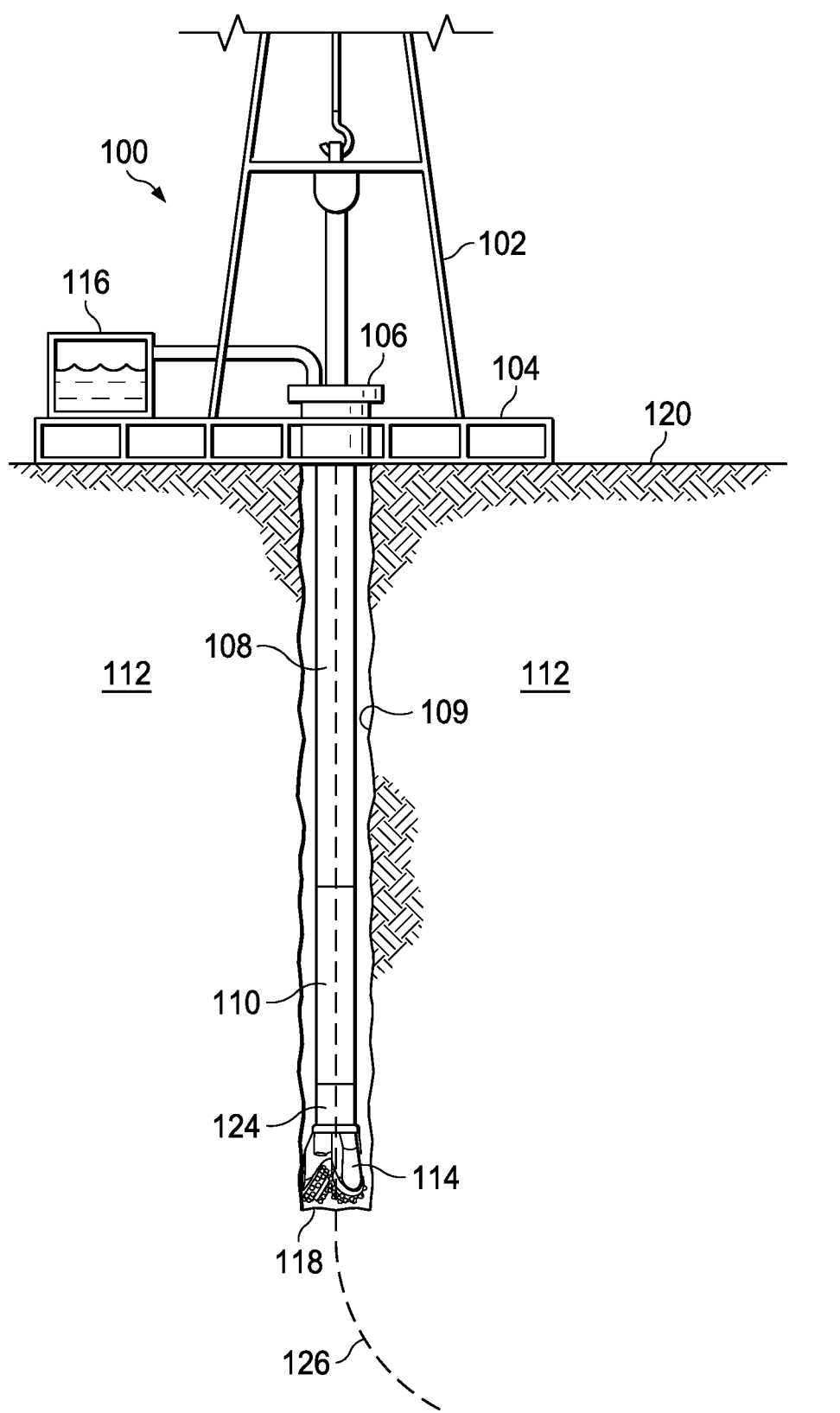
FIG. 1 is a schematic view of a drilling system within a well.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the disclosed subject matter, and it is understood that other embodiments may be utilized and that logical structural, mechanical, electrical, and chemical changes may be made without departing from the spirit or scope of the disclosure. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used herein, the singular forms "a", "an," and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity. The term "uphole' refers to "towards the surface along a wellbore," and the term "downhole" refers to "towards the bottom or end of the wellbore away from the surface along the wellbore."

The present disclosure relates generally to sensor communication during wellbore measurements. More particularly, in one aspect, the present disclosure relates to providing sensor communication at new frequencies along a single wire bus within a bottom hole assembly that does not interfere with operation of legacy sensors positioned along the single wire bus (e.g., legacy sensor communication) or with operation of other sensors communicating at different frequencies. A legacy sensor is a tool currently positioned along a single wire bus and generally communicates using a single wire protocol based on MIL-STD-1553 standard for electrical characteristics of a data bus and typically communicates with another sensor. A legacy sensor may be a sensor for receiving, transmitting or both receiving and transmitting legacy communication signals based on the MIL-STD-1553 standard. A legacy system employing only legacy sensors based on MIL-STD-1553 standard traditionally use only one bus master from a communications and control perspective and employs legacy communication signals between the legacy sensors over the data bus. For example, a legacy receiving sensor is capable of receiving and decoding legacy communication signals over the single wire bus based on the MIL-STD-1553 standard. Legacy communication signals are data transmissions over the single wire bus in compliance with MIL-STD-1553 standard. The presently disclosed embodiments may employ multiple bus masters for multifrequency communication over the same physical wire communication path and be used in horizontal, vertical, deviated, or otherwise nonlinear wellbores in any type of subterranean formation. Embodiments may include sensors adapted to communicate over a same or different carrier frequency than the legacy systems, and may include legacy sensors of varying ranges and types to provide an accurate position of a drill bit while drilling a wellbore and an accurate reading of formation characteristics near the drill bit while surveying a formation surrounding the wellbore.

Referring to FIG. 1, a schematic view of a drilling system 100 is illustrated. The drilling system 100 includes a derrick 102 that is buttressed by a derrick floor 104. The derrick floor 104 supports a rotary table 106 that is driven during drilling at a desired rotational speed, for example, via a chain drive system through operation of a prime mover (not shown). The rotary table 106, in turn, provides the rotational force to a drill string 108 within a wellbore 109. The drill string 108, as illustrated, is coupled to a bottom hole assembly (BHA) 110. As described in detail below with reference to FIG. 2, the BHA 110 includes sensors and legacy sensors positioned along a single wire bus to take survey measurements of a formation 112 and positioning measurements of a drill bit 114.

The drilling system 100 also includes a drilling fluid reservoir 116. The drilling fluid reservoir 116 provides drilling fluid (e.g., drilling mud) through the drill string 108 to the BHA 110. The drilling fluid may continuously circulate through drill string 108, to an end 118 of the wellbore 109, and back to a surface 120. Further, the drilling fluid provides hydrostatic pressure that prevents formation fluids from entering into the wellbore 109, keeps the drill bit 114 cool and clean, and carries out drill cuttings during a drilling process. When a drilling motor is present within a steering system 124 between the BHA 110 and the drill bit 114, the flow of drilling fluid through the drill string 108 generates power at the BHA 110. In some embodiments, the power generated at the drilling motor provides power to the BHA 110. While the drilling motor is described as a part of the steering system 124 positioned between the BHA 110 and the drill bit 114, the drilling motor may be positioned anywhere along the drill string 108 sufficient to provide power to downhole tools of the drilling system 100.

In an embodiment, the steering system 124 is positioned in close proximity to the drill bit 114. The steering system 124 provides steering control to the drill bit 114 in addition to the drilling motor functions described above. For example, a target path 126 is programmed into the steering system 124 prior to commencing a drilling operation of the wellbore 109. The target path 126 may be embodied as instructions stored in a memory of the steering system 124, and a processor of the steering system 124 executes the instructions to control the direction of drilling by the drill bit 114. Sensors within the BHA 110 or the legacy sensors may provide survey data to the steering system 124 during drilling operations that provides an indication of a location of the drill bit 114 during the drilling process. The steering system 124 uses this data to maintain the drill bit 114 on the target path 126 or to realign the drill bit 114 to the target path 126 when the steering system 124 receives an indication that the drill bit 114 has drifted from the target path 126.

Figure 2:
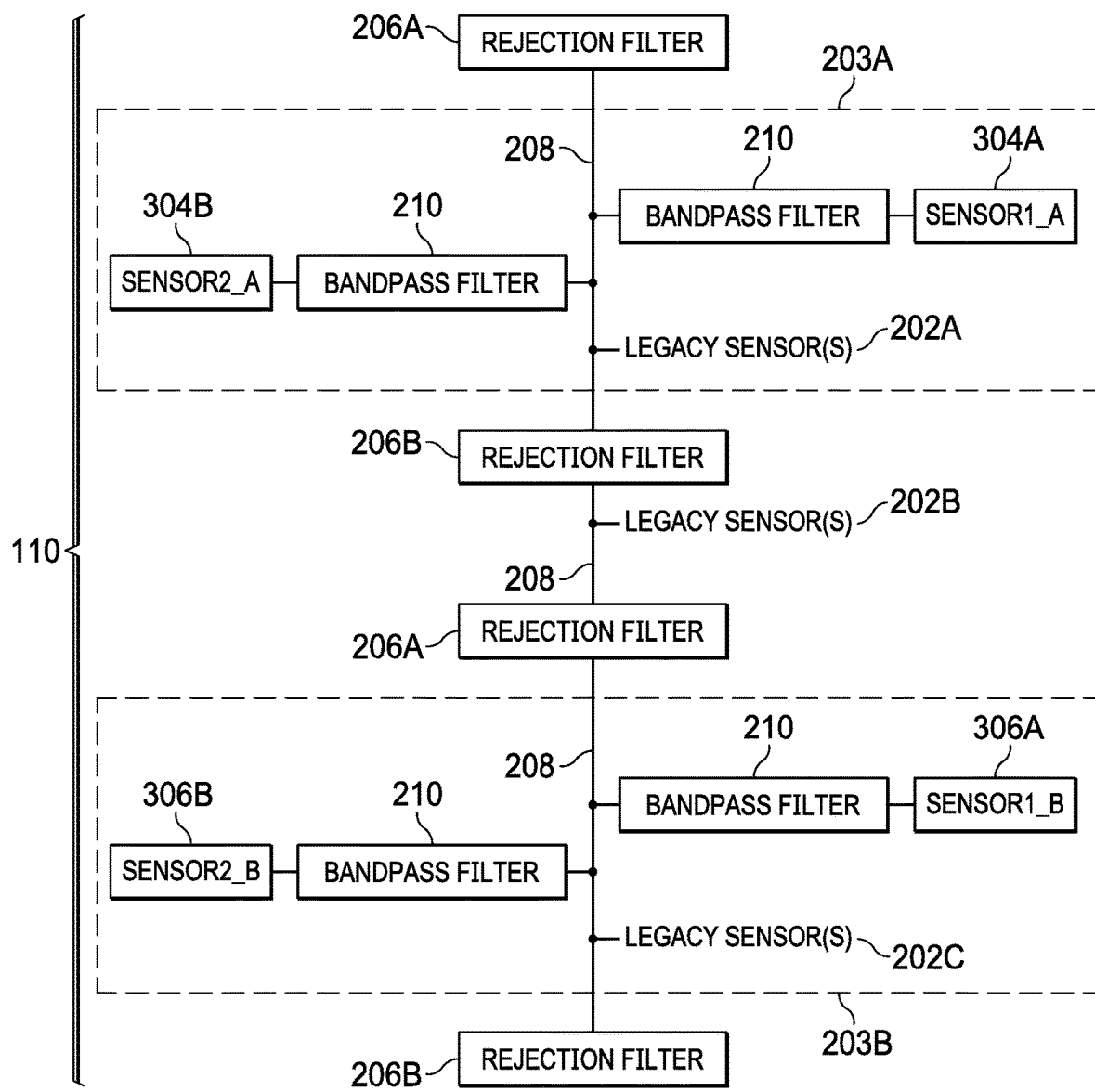
FIG. 2 is a schematic view of an embodiment of certain components of a bottom hole assembly of the drilling system of FIG. 1.

FIG. 2 is a generalized schematic view of an embodiment of certain components of the BHA 110 of the drilling system 100. In an embodiment, the BHA 110 includes one or more legacy sensors 202A-202C, a first set of sensors 304A, 304B, and a second set of sensors 306A, 306B. The first set of sensors 304A, 304B and the second set of sensors 306A, 306B may each include one or more deep reading resistivity tool transmitters, and one or more deep reading resistivity tool receivers positioned along a single wire bus 208 of the BHA 110. The legacy sensors 202, first set of sensors 304A, 304B and the second set of sensors 306A, 306B may include accelerometers, gyroscopes, magnetometers, resistivity tools, and any other downhole tools that, when used in varying combinations, provide an indication of the location of the drill bit 114 and characteristics of the formation 112 surrounding the wellbore 109 at a position of the BHA 110. The sensors 304, 306 and any sensor herein may comprise transmitters, receivers or both. Information concerning the formation may be stored in a memory in the sensors 304, 306, and any sensor herein, and accessed at the surface 120 upon removal of the BHA 110 from the wellbore 109.

The legacy sensors 202 may communicate across the single wire bus 208 using a legacy single wire protocol based on a MIL-STD-1553 standard for bus communication. The legacy single wire protocol is a protocol for communication between legacy sensors 202 (i.e., tools currently implemented on a bottom hole assembly) positioned along the single wire bus 208. The communication over the single wire bus 208 under the legacy single wire protocol typically involves communication using square waves at a frequency within an order of magnitude of 200 kHz. The single wire bus 208 may also provide power to the legacy sensors 202. As used herein, the term "legacy sensor" may refer to any sensor positioned along the single wire bus 208 that communicates along the single wire bus 208 at a different frequency than the first set of sensors 304A, 304B and the second set of sensors 306A, 306B, both sets operating at a high frequency. As used herein, the term "high frequency" may refer to a communications frequency that is at least more than approximately 5 times greater than the frequency of a legacy signal of the legacy sensors 202.

FIG. 2 also illustrates a plurality of systems on the same BHA 110 using a same carrier frequency. The two systems are illustratively shown as creating or operating within two zones including a first zone 203A and a second zone 203B operating at the same carrier frequency. However, signals from the first zone and signals from the second zone are not interlaced along the bus 208. Communication signals within the first zone do not disturb signals sufficiently to prevent accurate message or signal readability within the second zone and, conversely, signals within the second zone do not disturb signals sufficiently to prevent accurate message or signal readability within the first zone so that respective signals originating within a particular zone are readable within that particular zone.

First zone 203A comprises sensor1_A 304A and sensor2_A 304B operatively in communication at a high frequency with one another for data and synchronization. A second zone 203B comprises sensor2_B 306A and sensor2_B 306B operatively in communication at the high frequency with one another for data and synchronization. One or more rejection filters 206A, 206B may be positioned to demarcate each end of the zones 203A, 203B to allow lower frequency signals from the legacy sensors 202A-202C to be received at another legacy sensor 202A-202C while blocking transmission of the higher frequency signals between zones. This permits the first set of sensors 304A, 304B to communicate with one another, and the second set of sensors 306A, 306B to communicate with one another, while preventing high frequency signals in one zone to interfere with high frequency signals in the other zone. A bandpass filter 210 is tuned to permit high frequency signals to pass to each respective sensor 304A, 304B, 306A and 306B while also blocking signals from the legacy sensors 202. Rejection filters 206A, 206B in both zones 203A, 203B may be designed to operate at the same frequency since high frequency sensors in the two zones 203A, 203B operate at a same high frequency.

Figure 3:
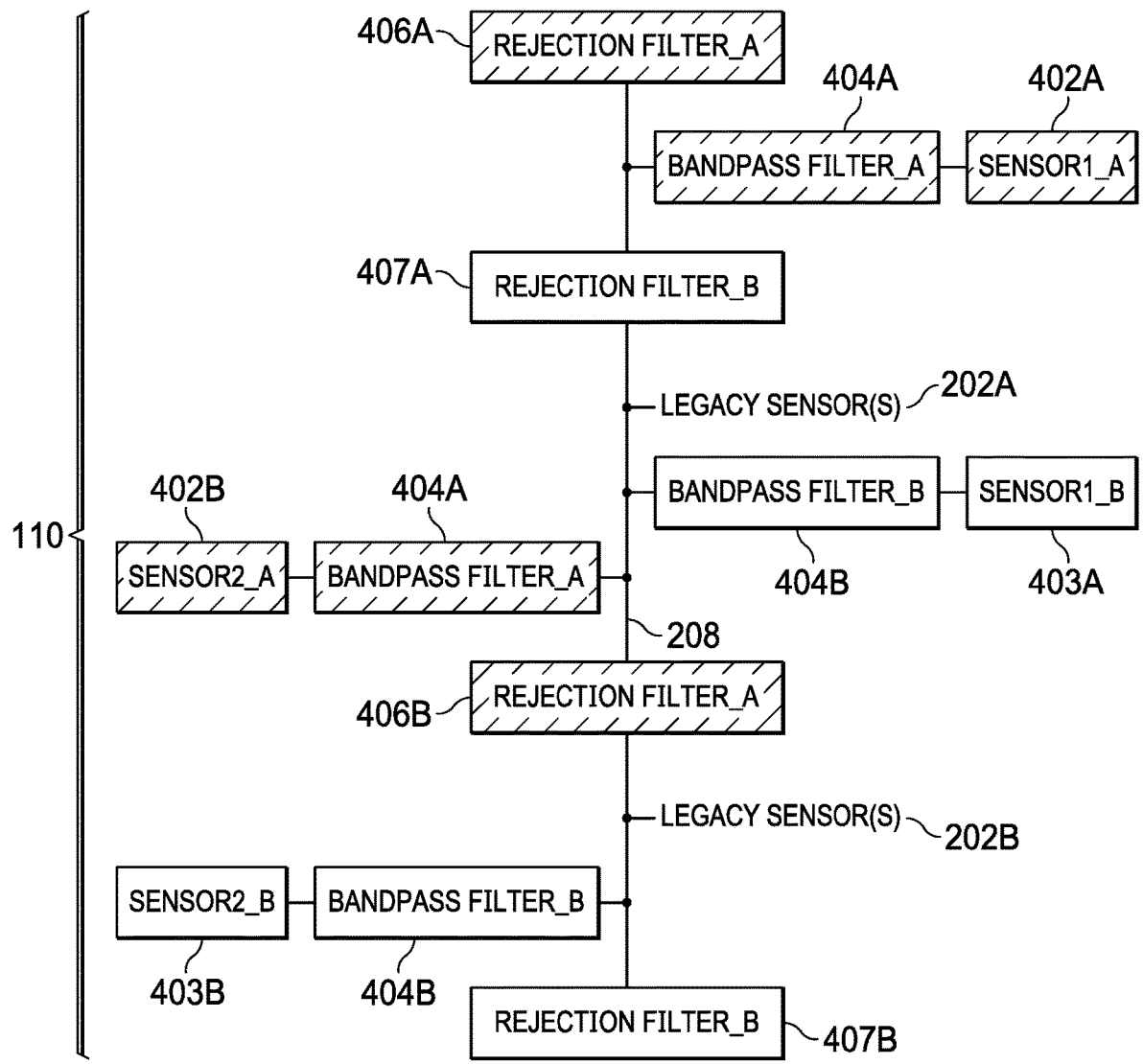
FIG. 3 is a schematic view of an embodiment of certain components of the bottom hole assembly of the drilling system of FIG. 1.

FIG. 3 is a generalized schematic view of an embodiment of certain components of the BHA 110 of the drilling system 100. In the embodiment of FIG. 3, the BHA 110 includes one or more legacy sensors 202A and 202B, a first set of sensors 402A and 402B operating at a first carrier frequency, and a second set of sensors 403A and 403B operating at a second carrier frequency. The signals from first set of sensors 402A and 402B may be interlaced with signals from the second set of sensors 403A and 403B along bus 208 since different carrier frequencies are employed. The first set of sensors 402A and 4024B and the second set of sensors 403A, 403B may each include one or more deep reading resistivity tool transmitters, and one or more deep reading resistivity tool receivers positioned along a single wire bus 208 of the BHA 110. The legacy sensors 202, first set of sensors 402A and 402B and the second set of sensors 403A and 403B may include accelerometers, gyroscopes, magnetometers, resistivity tools, and any other downhole tools that, when used in varying combinations, provide an indication of the location of the drill bit 114 and characteristics of the formation 112 surrounding the wellbore 109 at a position of the BHA 110. The sensors 202, 402 and 403 may comprise transmitters, receivers or both.

The first set of sensors 402A and 402B operating at a first carrier frequency may communicate with one another over the common single wire bus 208. The first carrier frequency is a different frequency from the second carrier frequency, and also different from the frequency utilized by the one or more legacy sensors 202A, 202B. The first set of high frequency sensors 402A, 402B communicating over the first carrier frequency forms a first zone of communication over the common single wire bus 208. The second set of high frequency sensors 403A, 403B communicating over the second carrier frequency forms a second zone of communication over the common single wire bus 208. The second carrier frequency is a different frequency from the first carrier frequency and also different from the frequency utilized by the one or more legacy sensors 202A, 202B. Communications of the first zone may overlap along the bus 208 with communications of the second zone, but communications from the zones do not interfere with one another due to each zone operatively communicating at different frequencies.

The first zone permits communication including synchronization among devices configured to communicate utilizing the first carrier frequency. The second zone permits communication including synchronization among devices configured to communicate utilizing the second carrier frequency. Communication by devices configured to communicate within the first zone do not impact the communications capability of the devices configured to communicate within the second zone. Likewise, the devices configured to communicate in the second zone do not impact the communications capability of the devices configured to communicate within the first zone. Legacy sensors 202 may be integrated anywhere along the common single wire bus 208 in conjunction with high frequency sensor devices in the first zone and the second zone.

Rejection filters 406A and 406B prevent high frequency signals of the first zone from extending beyond that portion of the single wire bus 208 between the two rejection filters 406A, 406B. Rejection filters 406A and 406B may be tuned to stop high frequency signals such as the first carrier frequency associated with zone 1 from extending further along the single wire bus 208.

Rejection filters 407A and 407B prevent signals of the second zone from extending beyond that portion of the single wire bus 208 between the two rejection filters 407A and 407B. Rejection filters 407A, 407B may be tuned to stop high frequencies such as the second carrier frequency associated with the second zone from extending further along the single wire bus 208.

The legacy sensors 202 may communicate across the single wire bus 208 using a legacy single wire protocol based on a MIL-STD-1553 standard for bus communication. The legacy single wire protocol is a protocol for communication between legacy sensors 202 (i.e., tools currently implemented on a bottom hole assembly) positioned along the single wire bus 208. The communication over the single wire bus 208 under the legacy single wire protocol typically involves communication using square waves at a frequency within an order of magnitude of 200 kHz. The single wire bus 208 may also provide power to the legacy sensors 202. More high frequency sensors may be included in the first zone or the second zone as required. Moreover, there may be more than two zones employed, with additional zones utilizing other carrier frequencies as needed. Zones may overlap with one another communicatively, or not overlap.

To prevent the lower frequency communication between the legacy sensors 202A and 202B and frequencies in other zones from interfering with the first higher frequency communication between the sensors 402A and 402B in the first zone, each of the sensors 402A, 402B include band pass filters 404A tuned to pass the first higher frequency between the sensors 402A, 402B, and the single wire bus 208. Likewise, to prevent the lower frequency communication between the legacy sensors 202A and 202B and frequencies in other zones from interfering with the second higher frequency communication between the sensors 403A and 403B in the second zone, each of the sensors 403A, 403B include bandpass filters 404B tuned to the second higher frequency positioned between the sensors 403A, 403B, and the single wire bus 208. Bandpass filters 404A design are different than bandpass filters 404B since sensor devices the first zone and sensor devices in the second zone operate at different frequencies. Likewise, rejection filters 406 are operationally different than rejection filters 407 since sensor devices in the first zone and sensor devices in the second zone operate at different frequencies.

Figure 4:
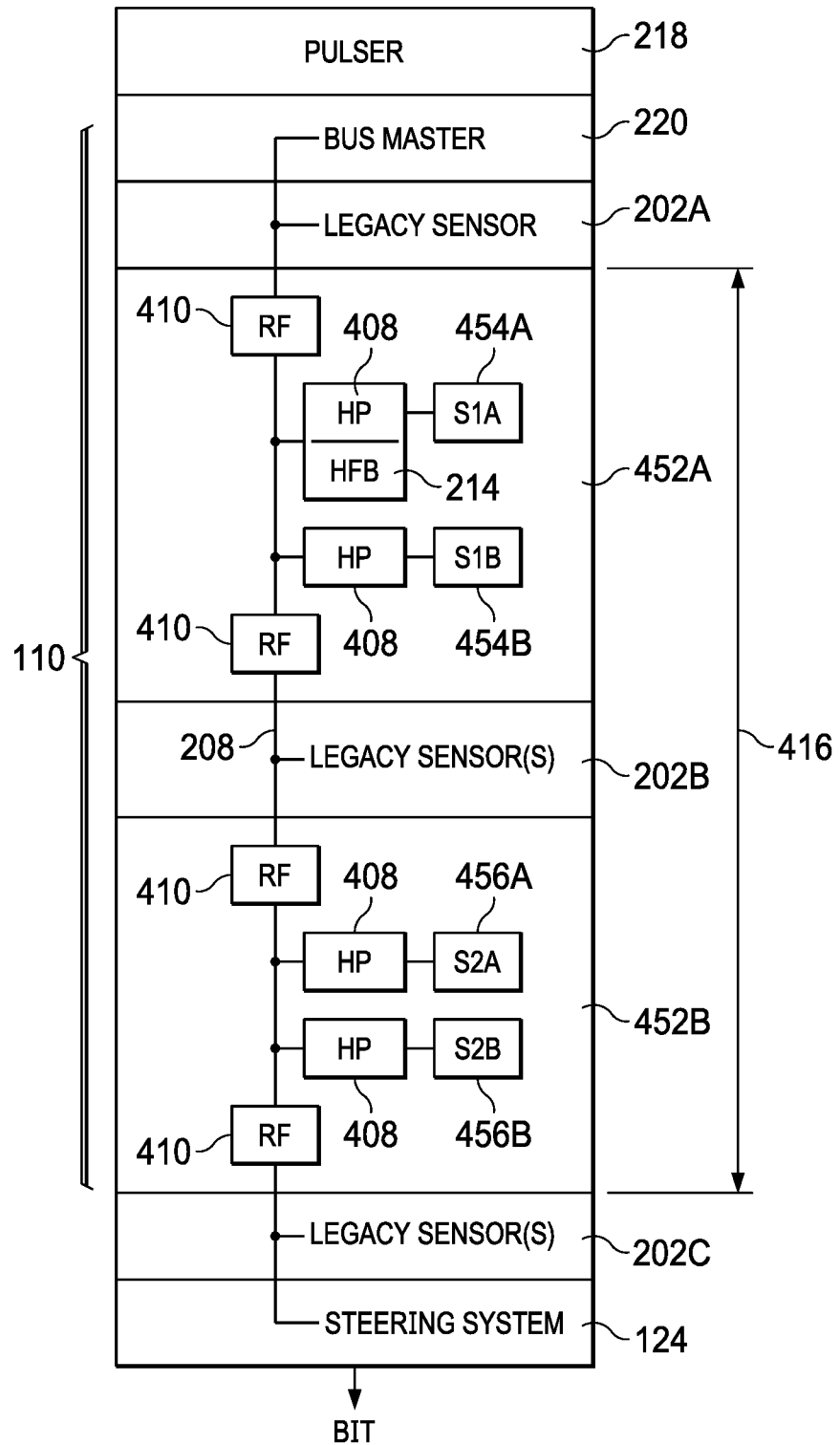
FIG. 4 is a schematic view of an embodiment of the bottom hole assembly of the drilling system of FIG. 1.

FIG. 4 is a schematic view of an embodiment of the BHA 110 and the steering system 124 of the drilling system 100. In an embodiment, the BHA 110 includes one or more legacy sensors 202 and one or more high frequency tool sensor zones 452A, 452B including a first zone and second zone positioned along the single wire bus 208 of the BHA 110. The legacy sensors 202 and the one or more high frequency tool sensor zones 452A, 452B may include accelerometers, gyroscopes, magnetometers, resistivity tools, and any other downhole tools that, when used in varying combinations, provide an indication of the location of the drill bit 114 and characteristics of the formation 112 surrounding the wellbore 109 at a position of the BHA 110.

The legacy sensors 202 communicate across the single wire bus 208 using the legacy single wire protocol based on a MIL-STD-1553 standard for bus communication. The legacy single wire protocol is a protocol for communication between legacy sensors 202 (i.e., tools currently implemented on a bottom hole assembly) positioned along the single wire bus 208. The communication over the single wire bus 208 under the legacy single wire protocol involves communication using square waves at a frequency within an order of magnitude of 200 kHz. The single wire bus 208 also provides power to the legacy sensors 202. As used herein, the term "legacy sensor" may refer to any sensor positioned along the single wire bus 208 that communicates along the single wire bus 208 at a different frequency than sensors 454 and 456 of the high frequency tool sensor zones 452A, 452B (e.g., at a different frequency than the high frequency communication sensors).

Upon implementing the high frequency tool sensor zones 452A, 452B (i.e., sets of downhole tool sensors) along the single wire bus 208, the single wire bus 208 is able to provide additional physical layers for communication between the sensors 454A and 454B, and between the sensors 456A and 456B and provide power for the sensors 454A, 454B and 456A, 456B. As used herein, the term "high frequency" may refer to a communications frequency that is at least more than approximately 5 times greater than the frequency of a legacy signal of the legacy sensors 202.

In operation, the sensors 454A and 454B of the high frequency tool sensor zone 452A may be receivers, transmitters, and/or transceivers and may communicate with each other using a signal with a frequency that is an order of magnitude greater than the frequency of legacy signals used by the legacy sensors 202 (e.g., an order of magnitude greater than 200 kHz). Similarly, the sensors 456A and 456B may be receivers, transmitters, and/or transceivers and may communicate with each other using a signal with the same frequency as the sensors 452A and 452B. While the sensors 454A, 454B, 456A and 456B are collectively referred to as "communication sensors" or "high frequency downhole tool sensors," it may be appreciated by those skilled in the art that the "communication sensors" are defined as sensors that are capable of communicating across the single wire bus 208 at a frequency greater than the frequency of legacy signals used by the legacy sensors 202 for legacy sensor communication.

To prevent the lower frequency communication between the legacy sensors 202A, 202B, and 202C from interfering with the higher frequency communication between the sensors 454A, and 454B and the sensors 456A and 456B, each of the sensors 454A, and 454B and the sensors 456A and 456B include high pass filters 408 positioned between each of the sensors 454A, and 454B and the sensors 456A and 456B and the single wire bus 208. The high pass filters 408 may be high pass filters that allow all frequencies above a certain tone of interest to pass, or the high pass filters 408 may be band pass filters that allow only a band of frequencies around a tone of interest to pass. Additionally, to prevent the higher frequency communication between the sensors 454A, and 454B and between the sensors 456A and 456B from interfering with the legacy communication signals or the high frequency communication signals of a separate high frequency tool sensor zone, rejection filters 410 are positioned along the single wire bus 208 at entrances and exits of the high frequency tool sensor zones 452A and 452B. That is, the rejection filters 410 may be positioned at each end of the high frequency tool sensor zones 452A and 452B along the single wire bus 208.

The rejection filters 410 prevent the higher frequency signals from the sensors 454A, and 454B and the sensors 456A and 456B from extending beyond a portion of the single wire bus 208 that runs through the high frequency tool sensor zones 452A, 452B. Accordingly, the high frequency tones provided by the sensors 454A, and 454B and 456A and 456B are filtered out from the single wire bus 208 before the single wire bus 208 reaches the legacy sensors 202A, 202B, or 202C. In this manner, legacy sensor communication between the legacy sensors 202A, 202B, and 202C is achieved without interference from the high frequency tones of the sensors 304A, 304B, 306A, and 306B. Further, additional legacy sensors 202 may be positioned along portions of the single wire bus 208 that run through the high frequency tool sensor blocks 452A, and 452B. The additional legacy sensors 202 positioned in this manner may first be coupled to an additional low pass filter 310 to filter out the high frequency tones provided by the sensors 454A, and 454B and 456A and 456B.

Within a multi-frequency range of the single wire bus 208 (e.g., within the high frequency tool sensor zones 452A and 452B), the sensors 454A, and 454B and 456A and 456B each include the high pass filters 408 to prevent interference from the low frequency signals of the legacy sensors 202A, 202B, and 202C. Interference may arise from spurious signals, electromagnetic noise or other distortion of data on the single wire bus, and may prevent or diminish communications. In this manner, the single wire bus 208 is able to carry both the high frequency signals and the low frequency signals in a single amplitude modulated signal, and the high frequency signals and the low frequency signals do not interfere with each other when received at the sensors 454A, and 454B and 456A and 456B or the legacy sensors 202. In an embodiment, the low pass filters 210 may be positioned at each end of the high frequency tool zones 452A and 452B and may also be high frequency blocking filters or a band stop filters that reject the band of frequencies associated with the higher frequency sensors 454A, and 454B and 456A and 456B.

While the illustrated embodiment includes the legacy sensors 202A, 202B, and 202C and the high frequency tool sensor zones 452A and 452B positioned along the single wire bus 208, it is also contemplated that additional legacy sensors 202 and additional high frequency tool sensor zones may be positioned along the single wire bus 208. As a distance 416 between the legacy sensor 202A and the bottommost legacy sensors 202C may be greater than 100 feet, there may be sufficient room along the single wire bus 208 for several sets of tools.

In addition to facilitating communication between the sensors 454A and 454B, and 456A and 456B, which is known as downhole communication, one of the sensors 454A and 454B, and one of the sensors 456A and 456B may provide high frequency pulses across the single wire bus 208 to the remaining sensors 454A, and 454B and 456A and/or 456B of the BHA 110. The pulses are filtered out by the filters 410 upon exiting the high frequency tool sensor zones 452A and 452B and are allowed to pass between the sensors 454A and 454B, and 456A and 456B through the associated high frequency pass filters 408. The pulses may provide synchronized timing signals between the sensors 454A, and 454B and 456A and 456B within each of the high frequency tool sensor zones 452A, 452B such that the sensors 3454A, and 454B and 456A and/or 456B are able to obtain synchronized sample measurements upon outputting or receiving the pulse signals.

Synchronization of the sample measurements enables an accurate comparison of, for example, an electromagnetic signal transmitted into the formation 112 by the sensor 454A and electromagnetic signals received from the formation 112 by the sensor 454B. The changes in the signal (e.g., a time shift, a change in amplitude, etc.) provide details about characteristics of the formation 112. The sample measurements may be stored within a memory located within each of the sensors 454, 456 and analyzed at the surface 120 upon removal of the BHA 110 from the wellbore 109.

While the sensors 454A and 454B, and 456A and 456B are described above using communication schemes at different frequencies from the legacy communication schemes, the sensors 454A and 454B, and 456A and 456B maintain communication capabilities using the legacy communication schemes. In an embodiment, a bus master 220 is able to receive data from both legacy signals injected onto the single wire bus 208 by the legacy sensors 202 and communication signals injected onto the single wire bus 208 by the sensors 454A and 454B, and 456A and 456B. The bus master 220 is then able to select data to send to a pulser 218. The pulser 218 pulses the data received from the bus master 220 to the surface 120 using mud pulse telemetry or electromagnetic pulses, for example. The bus master 220 and at least one pulser 218 may also be employed in the embodiments of FIGS. 2 and 3.

Using the high frequency tool sensor zones 452A and 452B, multiple tool sensor zones are able to be positioned along the single wire bus 208 without interfering with the communication of the other tool sensor zones or the legacy sensors 202. Further, while only two high frequency tool sensor zones 452A and 452B are depicted with two sensors each. Additional high frequency tool sensor zones with two or more sensors are also contemplated FIG. 4 is a schematic view of an embodiment of the BHA 110 and the steering system 124 of the drilling system 100. In an embodiment, the BHA 110 includes one or more legacy sensors 202 and one or more high frequency tool sensors 402A and 402B positioned along the single wire bus 208 of the BHA 110. The legacy sensors 202 and the one or more high frequency tool sensors 502 may include deep reading resistivity tools, very deep look ahead tools, accelerometers, gyroscopes, magnetometers, resistivity tools, and any other downhole tools that, when used in varying combinations, provide an indication of the location of the drill bit 114 and characteristics of the formation 112 surrounding the wellbore 109 at a position of the BHA 110. As used herein, multiple high frequency tool sensors 502A and/or multiple high frequency tool sensors 502B may each be referred to as sets of downhole tool sensors. An individual set of downhole tool sensors may refer to two or more high frequency tool sensors 502 communicating with each other using a single communication frequency.

The legacy sensors 202 communicate across the single wire bus 208 using the legacy single wire protocol based on a MIL-STD-1553 standard for bus communication. The legacy single wire protocol is a protocol for communication between legacy sensors 202 (i.e., tools currently implemented on a bottom hole assembly) positioned along the single wire bus 208. The communication over the single wire bus 208 under the legacy single wire protocol involves communication using square waves at a frequency within an order of magnitude of 200 kHz. The single wire bus 208 also provides power to the legacy sensors 202. As used herein, the term "legacy sensor" may refer to any sensor positioned along the single wire bus 208 that communicates along the single wire bus 208 at a different frequency than the sensors 502A and 502B (e.g., at a different frequency than high frequency communication sensors).

Upon implementing the high frequency tool sensors 502 along the single wire bus 208, the single wire bus 208 is able to provide an additional physical layer for communication between the sensors 502A and 502B and provide power for the sensors 502A and 502B. As used herein, the term "high frequency" may refer to a communications frequency that is more than approximately 5 times greater than the frequency of a legacy signal of the legacy sensors 202.

In operation, the sensors 502A may be receivers, transmitters, and/or transceivers and may communicate with each other using a signal with a frequency that is an order of magnitude greater than the frequency of legacy signals used by the legacy sensors 202 (e.g., an order of magnitude greater than 200 kHz), or, in another embodiment, with a frequency that is at least five times greater than the frequency of the legacy signals. Similarly, the sensors 502B may be receivers, transmitters, and/or transceivers and may communicate with each other using a signal an order of magnitude or five times greater than the frequency of the legacy signals but different from the frequency used by the sensors 502A. As an example of the communication signals used by the sensors 502A and 502B, the sensors 502A may communicate across the single wire bus 208 at a tone of interest of approximately 1 MHz, while the sensors 502B communicate across the single wire bus 208 at a tone of interest of approximately 2 MHz. The communication signals provided by the sensors 502A and 502B may be pure tone sine waves with very little harmonics. Using the communication signals, two half-duplex communications along the single wire bus 208 are achieved between the sensors 502A and between the sensors 502B in addition to the communication achieved between the legacy sensors 202. While the sensors 502A and 502B are collectively referred to as "communication sensors" or "high frequency downhole tool sensors," it may be appreciated by those skilled in the art that the "communication sensors" are defined as sensors that are capable of communicating across the single wire bus 208 at a frequency greater than the frequency of legacy signals used by the legacy sensors 202 for legacy sensor communication.

To prevent the lower frequency communication between the legacy sensors 202A, 202B, and 202C from interfering with the higher frequency communication of the sensors 502A and 502B, each of the sensors 502A and 502B include high pass filters 504 positioned between the sensors 502A and 502B and the single wire bus 208. To prevent the higher frequency communication between the sensors 502A and the sensors 502B from interfering with the legacy communication signals received by the legacy sensors 202, band stop filters 506A and 506B are positioned between the sensors 502A and 502B and the legacy sensors 202A and 202B to prevent the frequency bands associated with the sensors 502A and 502B from interfering with the legacy communication signals at the legacy sensors 202A and 202B.

In an embodiment, a legacy sensor 508 may be positioned between the two pairs of band stop filters 506A and 506B. In such an embodiment, a low pass filter 510 may be installed between the legacy sensor 508 and the single wire bus 208 to filter any high frequency signals from interfering with the legacy communication signal received or communicated by the legacy sensor 508. The low pass filter 510 prevents the higher frequency signals from the sensors 502A and 502B from extending to the legacy sensor 508 regardless of where the band stop filters 506A and 506B are positioned. Through the low pass filter 510 and the pairs of band stop filters 506A and 506B, the high frequency tones provided by the sensors 502A and 502B are filtered out from the single wire bus 208 before the single wire bus 208 reaches the legacy sensors 202A, 202B, or 508. In this manner, legacy sensor communication between the legacy sensors 202A, 202B, and 508 is achieved without interference from the high frequency tones of the sensors 502A and 502B. In an embodiment, the legacy sensors 202A, 202B, and 508 include more than one legacy sensor.

Within a multi-frequency range of the single wire bus 208 (e.g., between the furthest uphole band stop filter 506A and the furthest downhole band stop filter 506B), the sensors 502A and 502B each include the high pass filters 504A and 504B to prevent interference from the low frequency signals of the legacy sensors 202A, 202B, and 508 as well as to prevent interference from the higher frequency signals to which the high pass filters 504A and 504B are not tuned.

As illustrated, the band stop filters 506A and 506B are positioned along the single wire bus 208. The band stop filters 506A and 506B are tuned to stop passage of signals within a tuned band of frequencies. By way of example, if the sensors 502A communicate at a frequency of 1 MHz, the band stop filter 506A may be tuned to stop signals with a frequency that falls within a frequency band from 900 kHz to 1.1 MHz while allowing all other frequencies to pass to portions of the single wire bus 208 on an opposite side of the band stop filter 506A. The frequency band of the band stop filter 506A may also be smaller or larger depending on how many frequencies are communicated across the single wire bus 208. Similarly, if the sensors 502B communicate at a frequency of 2 MHz, the band stop filter 506B may be tuned to stop passage of signals with a frequency that falls within a frequency band from 1.9 MHz to 2.1 MHz. The frequency band of the band stop filter 506B may also be smaller or larger depending on how many frequencies are communicated across the single wire bus 208. In this manner, the band stop filters 506A and 506B prevent communication signals from the sensors 502A and 502B from passing beyond the pairs of the band stop filters 506A and 506B such that the legacy communication signals received by the legacy sensors 502A and 502B are unaffected by the communication signals from the sensors 502A and 502B.

In addition to facilitating communication between the sensors 502A and 502B, which is known as downhole communication, one of the sensors 502A and one of the sensors of 502B may provide high frequency pulses across the single wire bus 208 to the remaining sensors 502A and 502B positioned along the BHA 110. The pulses are filtered out by the band stop filters 506A and 506B and the low pass filter 510 prior to reaching the legacy sensors 202A, 202B, and 508, and the pulses are able to pass to between the sensors 502A and 502B through their respective high frequency pass filters 504A and 504B. The pulses provide synchronized timing signals between the group of sensors 502A and the group of sensors 502B such that the sensors 502A and 502B are able to obtain synchronized sample measurements upon outputting or receiving the pulse signals.

While the sensors 502A and 502B are described above using communication schemes at different frequencies from the legacy communication schemes, the sensors 502A and 502B may maintain communication capabilities using the legacy communication schemes. In an embodiment, a bus master 220 is able to receive data from both legacy signals injected onto the single wire bus 208 by the legacy sensors 202 and communication signals injected onto the single wire bus 208 by the sensors 502A and 502B. The bus master 220 is then able to select data to send to a pulser 218. The pulser 218 pulses the data received from the bus master 220 to the surface 120 using mud pulse telemetry or electromagnetic pulses, for example.

Using the tuned band stop filters 506 and the tuned high frequency pass filters 504 enables multiple sensors 502 to communicate at different frequencies along the single wire bus 208. That is, multiple sets of the sensors 502 (e.g., 502A, 502B, etc.) are able to communicate along the same single wire bus 208 without interfering with communication of the other sets of the sensors 502. Further, while only two sets of the sensors 502A and 502B are depicted with two sensors each, additional sets of sensors 502 with two or more sensors communicating at frequencies other than the communication frequencies of the sensors 502A and 502B are also contemplated. In such an embodiment, each of the sets of the sensors 502 are able to communicate absent interference originating from legacy sensors 202 or the other sets of the sensors 502. The sensors 502 may include deep reading resistivity tools, very deep look ahead tools, accelerometers, gyroscopes, magnetometers, resistivity tools, and any other downhole tools that, when used in varying combinations, provide an indication of the location of the drill bit 114 and characteristics of the formation 112 surrounding the wellbore 109 at a position of the BHA 110.

Figure 5:
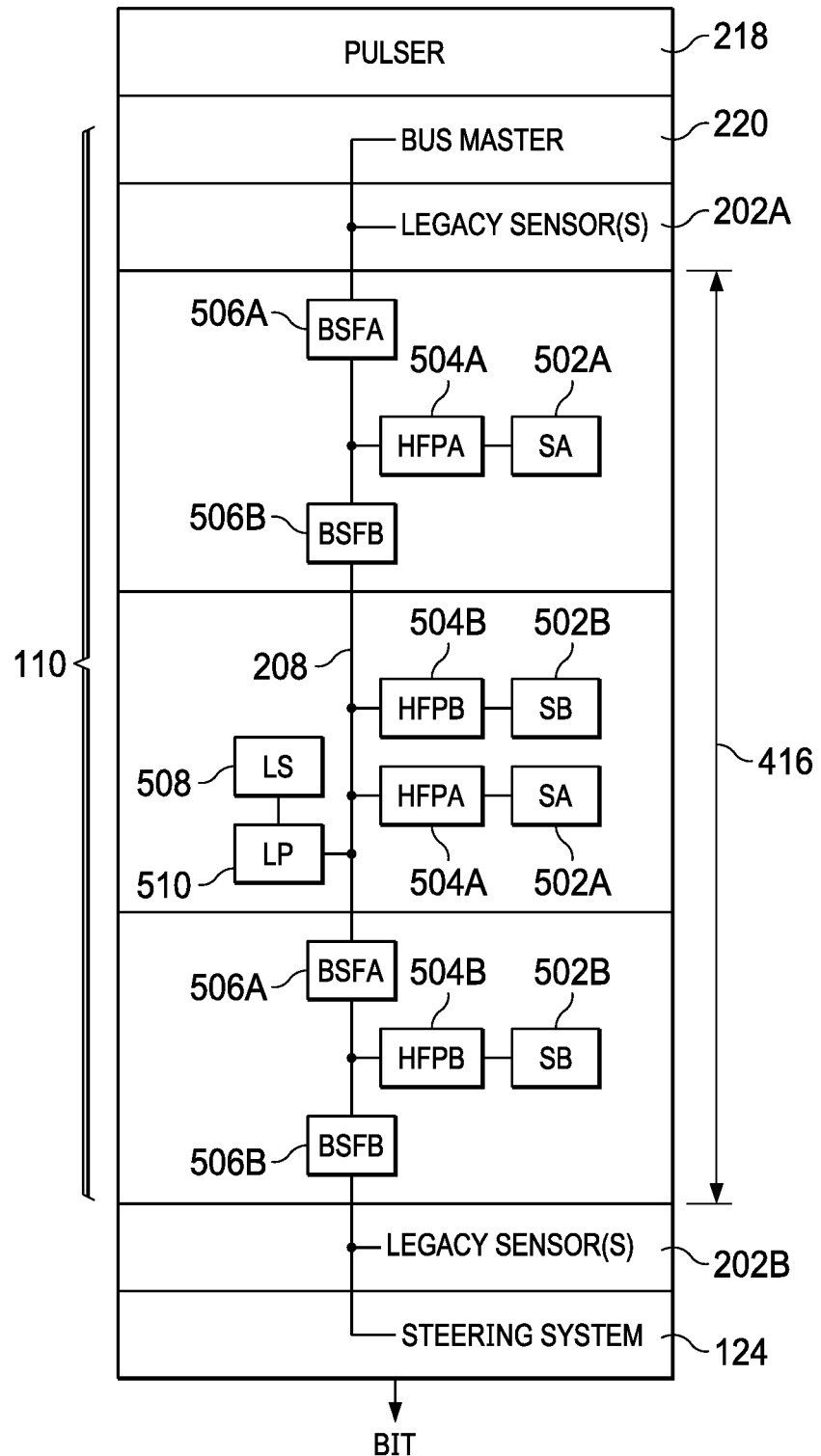
FIG. 5 is a schematic view of an embodiment of the bottom hole assembly of the drilling system of FIG. 1.
Figure 6A:
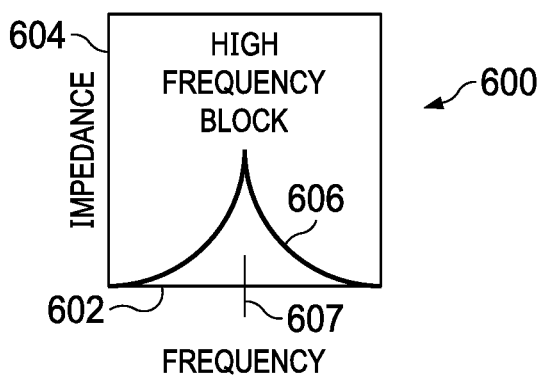
FIG. 6A is a chart illustrating operation of a high frequency blocking filter.

FIG. 6A is a chart 500 illustrating operation of the high frequency blocking filter 214 discussed above with respect to FIG. 4 and/or the band stop filter 506 discussed above with respect to FIG. 5. The chart 600 includes an abscissa 602 representing signal frequency and an ordinate 604 representing impedance of the high frequency blocking filter 214 and/or the band stop filter 506. A line 606 within the chart 600 provides an illustration of the change in impedance of the high frequency blocking filter 214 as the frequency increases. In this particular high frequency blocking filter 214 and/or band stop filter 506, the impedance increases until the frequency reaches a tone of interest 607 established by the deep reading resistivity tool signal or other high frequency communication tool signal (e.g., 1 MHz). After passing the tone of interest 607, the impedance decreases toward zero as the frequency continues to increase. As illustrated, the impedance of the high frequency blocking filter 214 and/or the band stop filter 506 blocks transmission of the signal when the frequency is within a band surrounding the tone of interest 607. The high frequency blocking filter 214 and/or the band stop filter 506 may be designed in such a manner that only a small range of frequencies are blocked, and, in operation, the high frequency communication signal is maintained within the small range of blocked frequencies. To limit the range of frequencies that are blocked, the high frequency blocking filter 214 and/or the band stop filter 506 is designed with a high quality (Q) factor. By way of example, the range of blocked frequencies may be approximately 1 MHz±10 kHz. In this manner, a large spectrum of usable frequencies are available along the single wire bus 208 for legacy signals that will not interfere with transmission of the high frequency tool signals.

Figure 6B:
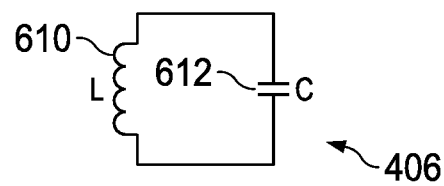
FIG. 6B is a schematic diagram of the high frequency blocking filter of the chart of FIG. 6A.

FIG. 6B is a schematic diagram of the high frequency blocking filter 214 and/or the band stop filter 506. The high frequency blocking filter 214 and/or the band stop filter 506 includes a high quality inductor 610 in parallel with a high quality capacitor 612. The inductance value for the inductor 610 and the capacitance value for the capacitor 612 are selected to establish a high Q factor of the high frequency blocking filter 214 and/or the band stop filter 506 such that only a narrow range surrounding the tone of interest 607 for the communication signals is blocked. Further, the inductance value for the inductor 610 and the capacitance value for the capacitor 612 are selected to block the tone of interest of a high frequency tool communication signal (e.g., 1 MHz, 2 MHz, etc.). For example, when the high frequency tool sensors 502A and 502B communicate at 1 MHz and 2 MHz, respectively, the band stop filters 506A and 506B may be tuned with inductors 610 and capacitors 612 that block frequency bands surrounding a 1 MHz tone of interest 607 and a 2 MHz tone of interest 607, respectively.

The high frequency blocking filter 214 and/or the band stop filter 506 may also be referred to as a notch filter due to a very narrow stopband resulting from the high Q characteristic of the high frequency blocking filter 214 and/or the band stop filter 506.

Figure 7A:
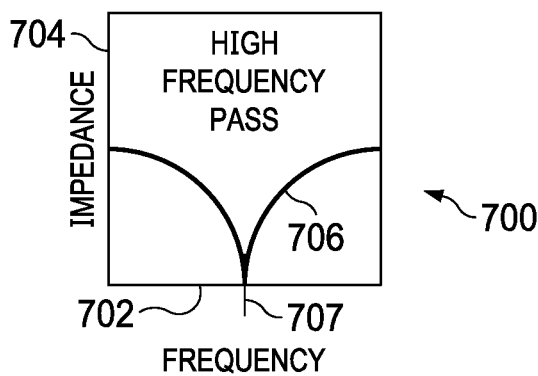
FIG. 7A is a chart illustrating operation of a high frequency pass filter.

FIG. 7A is a chart 700 illustrating operation of a high frequency pass filter 504. The chart 700 includes an abscissa 702 representing signal frequency and an ordinate 704 representing impedance of the high frequency pass filter 504. A line 706 within the chart 700 provides an illustration of the change in impedance of the high frequency pass filter 504 as the frequency increases. In the high frequency pass filter 504, the impedance is high at a low frequency and decreases until the frequency reaches the tone of interest 707 established by the deep reading resistivity tool signal (e.g., 1 MHz). As the line 706 approaches the tone of interest 707, the impedance approaches zero. After the frequency increases beyond the tone of interest 707, the impedance again increases.

Figure 7B:
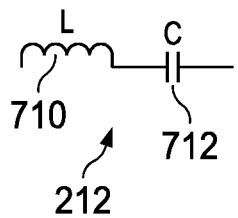
FIG. 7B is a schematic diagram of the high frequency pass filter of the chart of FIG. 7A.

FIG. 7B is a schematic diagram of the high frequency pass filter 504. The high frequency pass filter 504 includes an inductor 710 in series with a capacitor 712. The inductance value for the inductor 710 and the capacitance value of the capacitor 712 are selected such that only a narrow range of frequencies surrounding the tone of interest 707 for the deep reading resistivity tool signals and/or high frequency communication signals are passed through the high frequency pass filter 504. To achieve a similar passing range as the blocking range of the high frequency blocking filter 504, the inductance and capacitance values of the inductor 710 and the capacitor 712 are the same as values of the inductor 710 and the capacitor 712 of the blocking filter 504.

Figure 8:
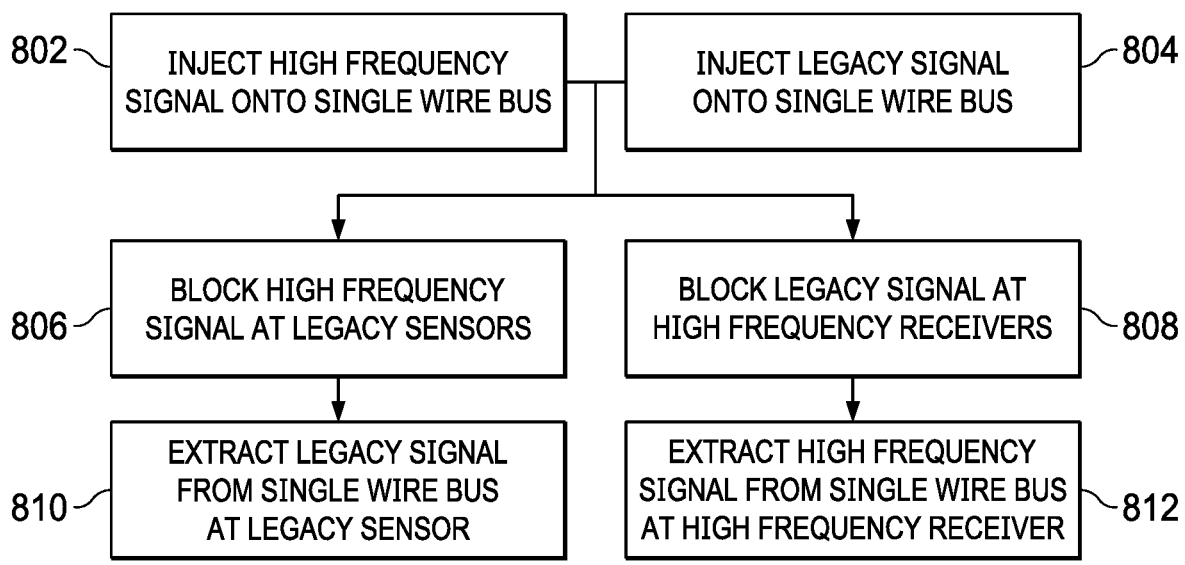
FIG. 8 is a flow chart of a method for multi-frequency communication across the single wire bus of FIGS. 2-5.

FIG. 8 is a flow chart of a method 800 for multi-frequency communication within a plurality of zones across the single wire bus 208. At block 802, at least one high frequency signal is injected onto the single wire bus 208 from sensors 304, 306, 402 and 454 or any other downhole tools that communicate at a frequency greater than the legacy sensors 202. The high frequency signal is used for downhole communication between the sensors 304, 306, 402 and 454 in addition to downhole communication with the bus master 220. In an embodiment, the high frequency signals may also be transmitted across the single wire bus 208 to provide signals to synchronize sampling of the sensors 304, 306, 402 and 454. The at least one high frequency may comprise at least two carrier frequencies, one carrier per zone.

At block 804, which may occur simultaneously or asynchronously with block 802, legacy signals of a frequency lower than the high frequency signals of block 802 are injected onto the single wire bus 208 from the legacy sensors 202. The frequency of the legacy signals is at least an order of magnitude less than the higher frequency signal of the sensors 304, 306, 402 and 454. For example, the legacy signals may be 200 kHz signals, while the higher frequency signals have a frequency of approximately 1 MHz, or higher. By maintaining the frequency levels an order of magnitude apart, a high Q passive filter is able to isolate the legacy signals from the higher frequency signals at the legacy sensors 202 and the sensors 304, 306, 402 and 454.

As an example, at block 806, the higher frequency signals from the sensors 304, 306, 402, 454 are blocked from the legacy sensors 202. The high frequency blocking filters, e.g., filters 410, 506, prevent frequencies within a range of the tone of interest of the higher frequency signals from passing to the legacy sensors 202. Similarly, the low pass filter 510 prevents frequencies above a specified range from passing to the legacy sensors 202. In this manner, the low pass filter 510 or the high frequency blocking filters, e.g., filters 410, 506, prevent the higher frequency signals from affecting the legacy signals at the legacy sensors 202.

In a similar manner, at block 808, legacy signals from the legacy sensors 202 are blocked at the high frequency sensors 304, 306, 402, 454. The legacy signals are blocked using a high frequency pass filter, e.g., filters 408 and 504. The high frequency pass filters allow passage of frequencies within a range of the tone of interest of the higher frequency signals provided by the sensors 304, 306, 402 and 454. In this manner, only the higher frequency signals matching a tuning of the high frequency pass filter 212 are received at the sensors 304, 306, 402 and 454, and the legacy signals and any other signals with frequencies outside of the pass range of the high frequency pass filter 408 and 504 do not interfere with the transmission of the higher frequency signals to the sensors 304, 306, 402 and 454.

With the high frequency signals blocked by the high frequency blocking filter e.g., filters 410, 506 at the legacy sensors 202, the legacy signals are extracted from the single wire bus 208 by the legacy sensors 202 at block 810. Blocking the high frequency signals originating from the sensors 304, 306, 402 and 454 limits the impact of noise originating from the high frequency signals on the legacy signals. In a similar manner, at block 812, the high frequency signals originating from the sensors 304, 306, 402 and 454 are extracted from the single wire bus 208 by the sensors 304, 306, 402, 454. Because the high frequency pass filter 408 and 504 allow only the higher frequency signals from the sensors 304, 306, 402 and 454, the likelihood of noise on the higher frequency signals originating from the legacy signals is limited.

Using the method 800, multiple communication zones and frequencies are available on the single wire bus 208 possibly with inexpensive modifications to the single wire bus 208 and the legacy sensors 202. Further, as the high or low frequencies are filtered out of a signal on the single wire bus 208 before being extracted from the single wire bus 208 by the legacy sensors 202 or the sensors 304, 306, 402 and 454, the signal frequencies not of interest to the legacy sensors 202 or the sensors 304, 306, 402 and 454 are invisible. For example, jitter introduced by the high frequency signal onto the low frequency signal is avoided when the low frequency signal is extracted from the single wire bus 208 by the legacy sensor 202. Similarly, jitter introduced by the low frequency signal onto the high frequency signal is avoided when the high frequency signal is extracted from the single wire bus 208 by the sensors 304, 306, 402 and 454.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowchart depicts a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a bottom hole assembly, comprising: a single wire bus; at least one legacy sensor coupled to the single wire bus configured to communicate at a legacy frequency; a first set of downhole tool sensors coupled to the single wire bus in a first communications zone, the first set of downhole tool sensors comprising a first sensor and a second sensor configured to communicate with one another along the single wire bus using a first frequency; and a second set of downhole tool sensors coupled to the single wire bus in a second communications zone, the second set of downhole tool sensors comprising a third sensor and a fourth sensor configured to communicate along the single wire bus using a second frequency, wherein communication signals within one of: the first zone and the second zone are undisturbed by communication signals within the other one of: the first zone and the second zone thereby permitting readability of communication signals within each zone.

Clause 2, the bottom hole assembly of clause 1, wherein communications using the first legacy frequency is undisturbed by communications using the first frequency of the first communication zone or the second frequency of the second communication zone.

Clause 3, the bottom hole assembly of clauses 1 or 2, wherein communications using the first frequency of the first communication zone or communications using the second frequency of the second communications zone are undisturbed by communications using the legacy frequency.

Clause 4, the bottom hole assembly of clauses 1, 2 or 3, wherein the first frequency is the same as the second frequency.

Clause 5, the bottom hole assembly of any one of clauses 1-4, wherein the first communications zone does not communicatively overlap with the second communications zone along the single wire bus.

Clause 6, the bottom hole assembly of clauses 1, 2 or 3, wherein the first frequency and the second frequency are different frequencies.

Clause 7, the bottom hole assembly of any one of clauses 1-3 and 6, wherein the first communication zone communicatively overlaps with the second communications zone along the single wire bus.

Clause 8, the bottom hole assembly of any one of clauses 1-7, further comprising a first high frequency blocking filter coupled between the at least one legacy sensor and the single wire bus, wherein the high frequency blocking filter is configured to block signals from the first communication zone and the second communication zone so that a legacy signal received at the at least one legacy sensor is undisturbed thereby permitting reading of the signal.

Clause 9, the bottom hole assembly of any one of clauses 1-8, comprising: a first high frequency pass filter coupled between the first sensor and the single wire bus, wherein the first high frequency pass filter is configured to pass signals at the first frequency; and a second high frequency pass filter coupled between the second sensor and the single wire bus, the second high frequency pass filter is configured to pass signals at the first frequency from the single wire bus to the second sensor.

Clause 10, the bottom hole assembly of clause 9, comprising: a third high frequency pass filter coupled between the third sensor and the single wire bus, wherein the third high frequency pass filter is configured to pass signals at the second frequency from the single wire bus to the third sensor; and a fourth high frequency pass filter coupled between the fourth sensor and the single wire bus, the fourth high frequency pass filter is configured to pass signals at the second frequency from the single wire bus to the fourth sensor.

Clause 11, the bottom hole assembly of any one of clauses 1-10, wherein the at least one legacy sensor comprises an accelerometer, a gyroscope, or a magnetometer.

Clause 12, the bottom hole assembly of any one of clauses 1-11, wherein the first set of downhole tool sensors and the second set of downhole tool sensors comprise deep reading resistivity tools, deep look ahead tools, or a combination thereof.

Clause 13, a method for communicating between multiple sets of sensors along a single wire bus, comprising: injecting a legacy communication signal from a set of legacy sensors onto the single wire bus; injecting a first communication signal from a first set of tool sensors in a first communication zone onto the single wire bus; injecting a second communication signal from a second set of tool sensors in a second communication zone onto the single wire bus; receiving the legacy communication signal at a legacy receiving sensor of the set of legacy sensors from the single wire bus after the first communication signal and the second communication signal are filtered from the single wire bus; receiving the first communication signal at a first receiving tool sensor of the first set of tool sensors from the single wire bus after the legacy communication signal and the second communication signal are filtered from the single wire bus; and receiving the second communication signal at a second receiving tool sensor of the second set of tool sensors from the single wire bus after the legacy communication signal and the first communication signal are filtered from the single wire bus.

Clause 14, the method of clause 13, wherein receiving the legacy communication signal comprises filtering a multi-frequency signal from the single wire bus using a low pass filter to block transmission of the first communication signal and the second communication signal to the legacy receiving sensor.

Clause 15, the method of clauses 13 or 14, wherein receiving the first communication signal comprises filtering a multi-frequency signal from the single wire bus using a band pass filter tuned to a frequency of the first communication signal to block transmission of the second communication signal and the legacy communication signal to the first receiving communication sensor.

Clause 16, the method of any one of clauses 11-15, wherein the first communication signal is transmitted at a same frequency as the second communication signal.

Clause 17, the method of any one of clauses 11-16, Wherein, first communication signal is transmitted at a first frequency and the second communication signal is transmitted at a second frequency, wherein the first frequency and the second frequency are each at least an order of magnitude greater than a legacy frequency of the legacy communication signal.

Clause 18, the method of clause 11, wherein the first communication signal from a first set of tool sensors in the first communication zone do not overlap along the single wire bus with the second communication signal from a second set of tool sensors in the second communication zone.

Clause 19, the method of clause 11, wherein the first communication signal from a first set of tool sensors in the first communication zone overlaps along the single wire bus with the second communication signal from a second set of tool sensors in the second communication zone.

Clause 20, the method of any one of clauses 11-19, wherein the at least one legacy sensor comprises an accelerometer, a gyroscope, or a magnetometer, and the first set of tool sensors and the second set of tool sensors comprise deep reading resistivity tools, deep look ahead tools, or a combination thereof.

While this specification provides specific details related to multi-frequency communications along a single wire bus, it may be appreciated that the list of components is illustrative only and is not intended to be exhaustive or limited to the forms disclosed. Other components related to the multi-frequency communications will be apparent to those of ordinary skill in the art without departing from the scope and spirit of the disclosure. Further, the scope of the claims is intended to broadly cover the disclosed components and any such components that are apparent to those of ordinary skill in the art.

It should be apparent from the foregoing disclosure of illustrative embodiments that significant advantages have been provided. The illustrative embodiments are not limited solely to the descriptions and illustrations included herein and are instead capable of various changes and modifications without departing from the spirit of the disclosure.

What is claimed is:

1. A bottom hole assembly, comprising:
   a single wire bus;
   at least one legacy sensor coupled to the single wire bus configured to communicate at a legacy frequency;
   a first set of downhole tool sensors coupled to the single wire bus in a first communications zone, the first set of downhole tool sensors comprising a first sensor and a second sensor configured to communicate with one another along the single wire bus using a first frequency;
   a second set of downhole tool sensors coupled to the single wire bus in a second communications zone, the second set of downhole tool sensors comprising a third sensor and a fourth sensor configured to communicate along the single wire bus using a second frequency;
   a first filter configured to:
      permit legacy sensor communication at a third frequency that is different from the first frequency and the second frequency to pass through the first filter, and
      restrict communication at the first frequency from passing through the first filter; and
   a second filter configured to:
      permit legacy sensor communication at the third frequency to pass through the second filter, and
      restrict communication at the second frequency from passing through the second filter,
   wherein communication signals within one of: the first communications zone and the second communications zone are undisturbed by communication signals within the other one of: the first zone and the second zone thereby permitting readability of communication signals within each zone.

2. The bottom hole assembly of claim 1, wherein communications using the legacy frequency is undisturbed by communications using the first frequency of the first communication zone or the second frequency of the second communication zone.

3. The bottom hole assembly of claim 1, wherein communications using the first frequency of the first communication zone or communications using the second frequency of the second communications zone are undisturbed by communications using the legacy frequency.

4. The bottom hole assembly of claim 1, wherein the first frequency is the same as the second frequency.

5. The bottom hole assembly of claim 1, wherein the first communications zone does not communicatively overlap with the second communications zone along the single wire bus.

6. The bottom hole assembly of claim 1, wherein the first frequency and the second frequency are different frequencies.

7. The bottom hole assembly of claim 1, wherein the first communication zone communicatively overlaps with the second communications zone along the single wire bus.

8. The bottom hole assembly of claim 1, further comprising a first high frequency blocking filter coupled between the at least one legacy sensor and the single wire bus, wherein the high frequency blocking filter is configured to block signals from the first communication zone and the second communication zone so that a legacy signal received at the at least one legacy sensor is undisturbed thereby permitting reading of the legacy signal.

9. The bottom hole assembly of claim 1, further comprising:
   a first high frequency pass filter coupled between the first sensor and the single wire bus, wherein the first high frequency pass filter is configured to pass signals at the first frequency; and
   a second high frequency pass filter coupled between the second sensor and the single wire bus, the second high frequency pass filter is configured to pass signals at the first frequency from the single wire bus to the second sensor.

10. The bottom hole assembly of claim 9, further comprising:
    a third high frequency pass filter coupled between the third sensor and the single wire bus, wherein the third high frequency pass filter is configured to pass signals at the second frequency from the single wire bus to the third sensor; and
    a fourth high frequency pass filter coupled between the fourth sensor and the single wire bus, the fourth high frequency pass filter is configured to pass signals at the second frequency from the single wire bus to the fourth sensor.

11. The bottom hole assembly of claim 1, wherein the at least one legacy sensor comprises an accelerometer, a gyroscope, or a magnetometer.

12. The bottom hole assembly of claim 1, wherein the first set of downhole tool sensors and the second set of downhole tool sensors comprise deep reading resistivity tools, deep look ahead tools, or a combination thereof.

13. A method for communicating between multiple sets of sensors along a single wire bus, comprising:
    injecting a legacy communication signal from a set of legacy sensors onto the single wire bus;
    injecting a first communication signal at a first frequency from a first set of tool sensors in a first communication zone onto the single wire bus;
    injecting a second communication signal at a second frequency from a second set of tool sensors in a second communication zone onto the single wire bus;
    permitting the legacy communication signal communicated at a third frequency that is different from the first frequency and the second frequency to pass through a first filter;
    restricting communication at the first frequency from passing through the first filter;
    permitting legacy sensor communication at the third frequency to pass through a second filter;

restricting communication at the second frequency from passing through the second filter;

receiving the legacy communication signal at a legacy receiving sensor of the set of legacy sensors from the single wire bus after the first communication signal and the second communication signal are filtered from the single wire bus;

receiving the first communication signal at a first receiving tool sensor of the first set of tool sensors from the single wire bus after the legacy communication signal and the second communication signal are filtered from the single wire bus; and receiving the second communication signal at a second receiving tool sensor of the second set of tool sensors from the single wire bus after the legacy communication signal and the first communication signal are filtered from the single wire bus.

14. The method of claim 13, wherein receiving the legacy communication signal comprises filtering a multi-frequency signal from the single wire bus using a low pass filter to block transmission of the first communication signal and the second communication signal to the legacy receiving sensor.

15. The method of claim 13, wherein receiving the first communication signal comprises filtering a multi-frequency signal from the single wire bus using a band pass filter tuned to a frequency of the first communication signal to block transmission of the second communication signal and the legacy communication signal to the first receiving sensor.

16. The method of claim 13, wherein the first communication signal is transmitted at a same frequency as the second communication signal.

17. The method of claim 13, wherein, the first communication signal is transmitted at the first frequency and the second communication signal is transmitted at the second frequency, wherein the first frequency and the second frequency are each at least an order of magnitude greater than a legacy frequency of the legacy communication signal.

18. The method of claim 13, wherein the first communication signal from the first set of tool sensors in the first communication zone do not overlap along the single wire bus with the second communication signal from the second set of tool sensors in the second communication zone.

19. The method of claim 13, wherein the first communication signal from the first set of tool sensors in the first communication zone overlaps along the single wire bus with the second communication signal from the second set of tool sensors in the second communication zone.

20. The method of claim 13, wherein the set of legacy sensors comprises an accelerometer, a gyroscope, or a magnetometer, and the first set of tool sensors and the second set of tool sensors comprise deep reading resistivity tools, deep look ahead tools, or a combination thereof.

* * * * *